United States Patent [19]

Watabe et al.

[11] Patent Number: 4,660,533

[45] Date of Patent: Apr. 28, 1987

[54] AIR INTAKE SIDE SECONDARY AIR SUPPLY SYSTEM FOR AN INTERNAL COMBUSTION ENGINE

[75] Inventors: Akira Watabe, Fujimi; Norio Tomobe, Asaka; Hideo Kobayashi, Kawagoe, all of Japan

[73] Assignee: Honda Giken Kogyo Kabushiki Kaisha, Tokyo, Japan

[21] Appl. No.: 865,481

[22] Filed: May 21, 1986

[30] Foreign Application Priority Data

May 24, 1985 [JP] Japan .................................. 60-111756

[51] Int. Cl.$^4$ ............................................ F02M 23/10
[52] U.S. Cl. ..................................... 123/588; 123/589
[58] Field of Search ................................ 123/585–589; 74/860

[56] References Cited

U.S. PATENT DOCUMENTS 4,541,400  9/1985  Kobayashi et al. ................. 123/589
4,569,318  2/1986  Fujimura et al. .................... 123/589
4,584,979  4/1986  Fujimura et al. .................... 123/589
4,586,481  5/1986  Kishida et al. ...................... 123/587

Primary Examiner—William A. Cuchlinski, Jr.
Attorney, Agent, or Firm—Pollock, VandeSande & Priddy

[57] ABSTRACT

Air intake side secondary air supply system for an internal combustion engine includes first and second secondary air supply passages leading to an intake manifold in which an open/close valve and an air control valve are respectively provided for a proportional control and an integral control of secondary air. In order to improve a driveability of the engine when no load is applied to the engine when the engine temperature is low, the air control valve is supplied with a pressure for rapidly closing the second air intake side secondary air supply passage so as to stop at least the integral control of the feedback control of air/fuel ratio immediately when a no-load condition is detected during a cold operation of the engine.

5 Claims, 2 Drawing Figures

AIR INTAKE SIDE SECONDARY AIR SUPPLY SYSTEM FOR AN INTERNAL COMBUSTION ENGINE

BACKGROUND OF THE INVENTION

1. Field of the Invention

The present invention relates to an air intake side secondary air supply system for an internal combustion engine.

2. Description of Background Information

In internal combustion engines provided with a three-way catalytic converter in the exhaust system for the purificaiton of exhaust gas, a feedback control is generally executed for controlling the air/fuel ratio in accordance with the composition of exhaust gas and the operating conditions of the engine. This is because an optimum operation of the three-way catalytic converter is attained when the air/fuel ratio of mixture is around a stoichiometric value (14.7:1 for example). An air intake side secondary air supply system for feedback control is an example of the system having air/fuel ratio control operation of this type, in which a secondary air passage leading to a portion of an intake air passage downstream of the throttle valve is provided and the amount of a secondary air flowing therethrough is controlled for performing the air/fuel ratio control.

In the case of internal combustion engines, a combustion state of the engine tends to be unstable during a warm-up period of the engine subsequent to a cold start of the engine. Therefore, in the air intake side secondary air supply system as mentioned above, the supply of the air intake side secondary air is stopped during the warm-up period so that the air/fuel ratio is enriched by stopping the feedback control operation.

For determining the time of restarting of the feedback control of the air/fuel ratio, it is desirable to detect a condition of the restart of the feedback control in response to the temperature of an intake air of the engine, because it is generally recognized that the air/fuel ratio of the mixture to be supplied to the engine varies depending on the temperature of the engine intake air. Therefore, in an example of the conventional system, the supply of the air intake side secondary air is stopped to enrich the air/fuel ratio when the temperature of the engine intake air is equal to or lower than a predetermined temperature $t_1$ (18° C. for example). Further, in Japanese Utility Model application No. 58-134919 which is assigned to the assignee of the present application, there is proposed an air/fuel ratio control system in which the feedback control of the air/fuel ratio is stopped to enrich the air/fuel ratio if the temperature of a cooling water of the engine is equal to or lower than a second predetermined temperature $t_2$ and at the same time a vehicle speed is equal to or lower than a predetermined speed $V_1$ (15 Mile/h for example), even though the intake air temperature is higher than the predetermined temperature $t_1$. This type of control operation is preferred because the choke valve disposed upstream of the throttle valve is closed to enrich the air/fuel ratio during the cold operation of the engine, and the enrichment of the air/fuel ratio is disturbed by the repetition of the supply and stop of the air intake side secondary air. Moreover, since the proportion of the variation of the secondary air with respect to the amount of the main intake is relatively large when the vehicle speed is low, the feedback control operation may lead to a hunting of the engine rotation which deteriorates the driveability of the engine.

In the air intake side secondary air supply system mentioned above, the feedback control of the air/fuel ratio is executed when the intake air temperature is above the predetermined level $t_1$ and the vehicle speed is above the predetermined speed $V_1$ although the cooling water temperature is lower than the predetermined temperature $t_2$. This is because the vehicle speed is high enough to introduce a relatively large amount of the main intake air under this condition, and the hunting of the engine rotation by the repetition of the supply and stop of the air intake side secondary air is not likely to occur even though the choke valve is not fully opened. Therefore, the purification of the exhaust gas by the feedback control of the air/fuel ratio is given a precedence over the driveability of the engine.

However, since an air intake side secondary air supply of integral control operation or a PI type control operation, which is a combined form of a proportional control operation and the integral control operation, is generally effected, the air/fuel ratio of the mixture to be supplied to the engine will enter into an over-lean range if the engine load is reduced to zero by pressing the clutch pedal to disconnect the power transmission for a deceleration or a gear shift operation when the vehic is running under the above mentioned condition, i.e. when the intake air temperature is above the predetermined level $t_1$ and the vehicle speed is above the predetermined speed $V_1$ although the cooling water temperature is lower than the predetermined temperature $t_2$. Such an over lean air/fuel ratio of the mixture is likely to cause the hunting of the engine rotation which leads to the deterioration of the driveability of the engine.

OBJECTS AND SUMMARY OF THE INVENTION

An object of the present invention is therefore to provide a an air intake side secondary air supply system for an internal combustion engine, in which measures are taken to prevent the increase of unburned components in the exhaust gas and the deterioration of the driveability upon transition to the open loop control mode.

According to the present invention, an air intake side secondary air supply system includes first and second secondary air supply passages in which an open/close valve operated in response to an air/fuel ratio detection signal and an air control valve whose opening degree is varied by a magnitude of pressure supplied to its pressure chamber are disposed respectively for proportional and integral control of supply of secondary air. The system is provided with an engine operation detection part for detecting a state of engine operation in which the temperature of the engine is low and no load is applied to the engine, and a pressure control part for gradually supplying a first control pressure to the pressure chamber of the air control valve so as to gradually increase the sectional area of a flow through the air control valve when a rich air/fuel ratio detected, and supplying gradually a second control pressure to the pressure chamber of the air control valve so as to gradually decrease the sectional area when a lean air/fuel ratio is detected and the engine operation is under a normal operating condition, and rapidly supplying the second control pressure to the pressure chamber of the air control valve so as to rapidly close said air control valve when the engine is operating under the condition of no load and the low temperature.

The foregoing and other objects and advantages of the present invention will become more clearly understood upon review of the following description taken in conjunction with the accompanying drawings.

DETAILED DESCRIPTION OF A PREFERRED EMBODIMENT

Figure 1:
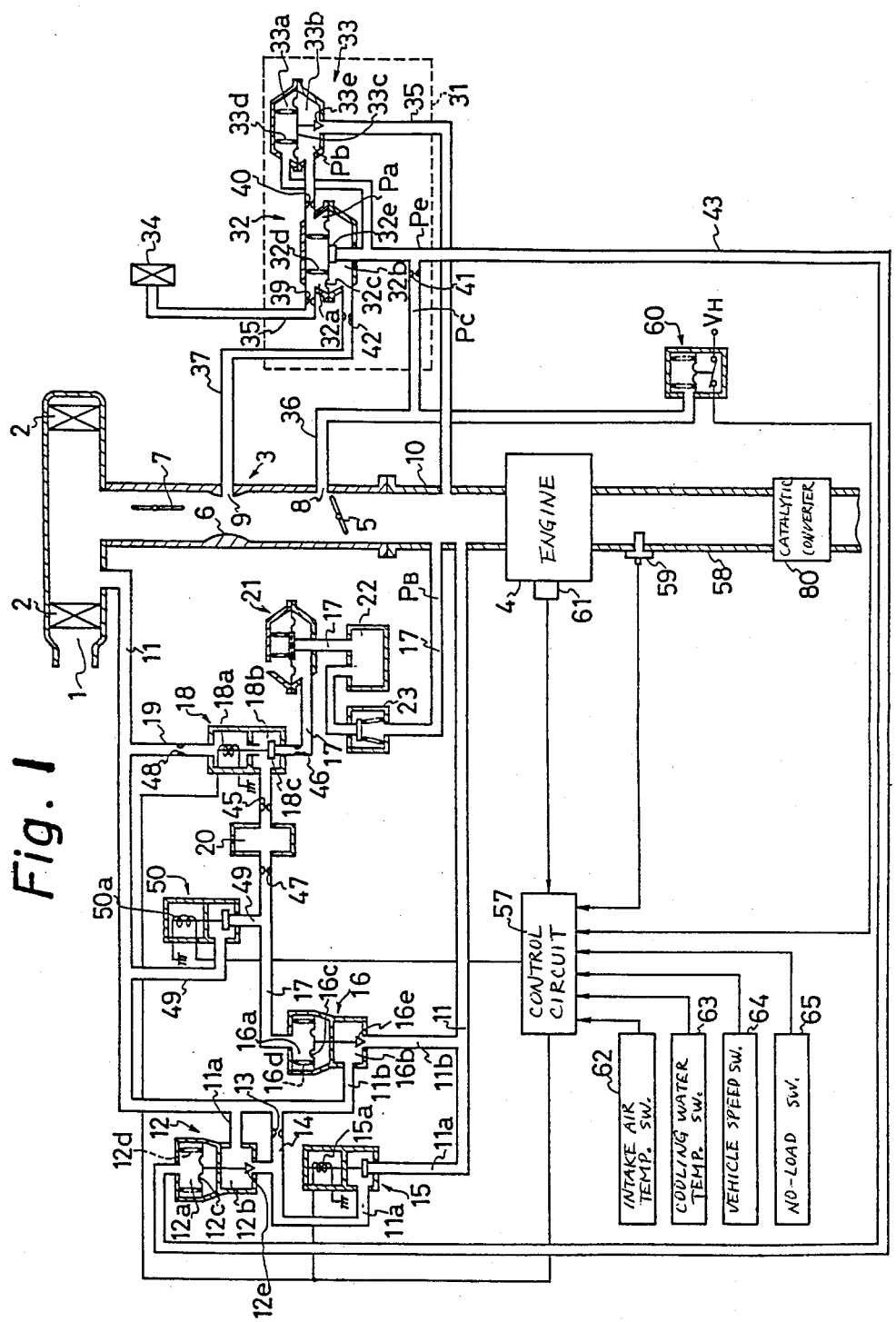
FIG. 1 is a schematic diagram of a preferred embodiment of the air intake side secondary air supply system of the present invention.

FIG. 1 schematically illustrates the preferred embodiment of the air intake side secondary air supply system of a vehicle engine according to the present invention is illustrated. As shown, an intake air introduced at an atmospheric air inlet port 1 is supplied to an engine 4 via an air cleaner 2 and a carburettor 3. The carburettor 3 is provided with a throttle valve 5 and a venturi 6 upstream of the throttle valve 5, and a choke valve 7 is provided upstream of the venturi 6. In a throttle body, a vacuum detection hole 8 is provided near the position of the throttle valve 5, in such a manner that it is located upstream of the throttle valve when the throttle valve 5 is closed and downstream of the throttle valve 5 when the throttle valve 5 is open. A vacuum detection hole 9 is also provided in the venturi 6. A portion of the throttle body downstream of the throttle valve 5, i.e. an intake manifold 10, communicates with the air cleaner 2 in the vincinity of an outlet port via an air intake side secondary air supply passage 11. In the middle of the air intake side secondary air supply passage 11, the passage is divided into two air control passages 11a and 11b so that the secondary air is diverted into two streams. A first air control valve 12 is provided in the air control passage 11a. The first air control valve 12 is made up of a vacuum chamber 12a which forms a second pressure chamber and a valve chamber 12b forming a part of the air control passage 11a, a diaphragm 12c forming a part of the vacuum chamber 12a, a valve spring 12d, and a tapered valve element 12e disposed in the valve chamber 12b and urged in a direction to close the air control passage 11a by the valve spring 12d. With this construction, the air control valve 12a varies the sectional area of the air control passage 11a in accordance with the magnitude of the vacuum applied to the vacuum chamber 12a in such a manner that the sectional area increases as the magnitude of the vacuum increases. An air correction passage 14 is provided so as to bypass the first air control valve 12 and an orifice 13 for correcting the idling operation is formed in the air correction passage 14.

Further, a solenoid valve 15 operating as the open/close valve is disposed in the air control passage 11a, downstream of the first air control valve 12. The solenoid valve 15 opens when a solenoid 15a disposed in it is energized.

A vacuum acting in the pressure chamber 12a of the first air control valve 12 is controlled by a vacuum control part 31.

The vacuum control part 31 is made up of a vacuum responsive regulation valve 32 and an air valve 33 which respectively consist of a vacuum chamber 32a or 33a, a valve chamber 32b and 33b, a diaphragm 32c or 33c, a valve spring 32d or 33d, and a valve element 32e or 33e. The vacuum chamber 32a is provided in the middle of a control air passage 35 which starts from an air inlet port 34 having a filter and leads to a part of the intake air passage downstream of the throttle valve 5 and the valve chamber 33b of the air valve 33 is also located in the control air passage 35 downstream of the vacuum chamber 32a. The valve element 33e is urged to close the control air passage 35 by means of the valve spring 33d via the diaphragm 33c. The vacuum chamber 33a communicates with the vacuum detection hole 8 via a vacuum passage 36. The valve chamber 32b communicates with the vacuum detection hole 9 via a vacuum passage 37. The valve chamber 32b communicates with the vacuum passage 36 and the valve element 32e is urged by the valve spring 32d via the diaphragm 32c so as to close the communication from the valve chamber 32b to the vacuum passage 36. In addition, orifices 39, 40 are provided in the control air passage 35, upstream and downstream respectively, of the vacuum chamber 32a. Orifices 41 and 42 are provided respectively in the vacuum passages 36 and 37. A part of the vacuum passage 36 on the side of the valve chamber 32b and the vacuum chamber 33, from the orifice 41 communicates with the vacuum chamber 12a of the first air control valve 12 via the vacuum supply passage 43.

On the other hand, in the air control passage 11b forming the second air intake side secondary air supply passage, there is provided a second air control valve 16 which is constructed in the same manner as the first air control valve 12, and consists of a vacuum chamber 16a, a valve chamber 16b, a diaphragm 16c, a valve spring 16d, and a tapered valve element 16e. The second air control valve 16 controls the sectional area of the air control passage 11b in accordance with the magnitude of the vacuum applied to the vacuum chamber 16a, in a manner that the sectional area increases as the magnitude of the vacuum increases.

The vacuum chamber 16a communicates with the part of the air intake passage downstream of the throttle valve 5 via the vacuum supply passage 17. In the vacuum supply passage 17, there is provided a solenoid valve 18 which is made up of a solenoid 18a, a valve chamber 18b which forms a part of the vacuum supply passage 17, a valve element 18c disposed in the valve chamber 18b and magnetically connected to the solenoid 18a. The valve chamber 18b communicates to the atmosphere via the atmospheric pressure supply passage 19 and closes the vacuum supply passage 17 when deenergized and at the same time a communication between a part of the vacuum supply passage 17 on the vacuum chamber 16a side and the atmospheric pressure supply passage 19 is made through the valve chamber 18b. A surge-tank 20 is provided in the vacuum supply passage 17 on the vacuum chamber 16a side from the solenoid valve 18, and a constant vacuum control valve 21, an storage tank 22, and a non-return valve 23 are provided in this order in the vacuum supply passage 17 on the downstream side of the throttle valve 5 from the solenoid valve 18. The constant vacuum control valve 21 is provided to stabilize the magnitude of the vacuum on the downstream side of the throttle valve 5 to a vacuum Pr which has a predetermined constant level when this magnitude of vacuum becomes greater than the predetermined value, and the non-return valve 23 allows only a flow of the air directed to the downstream portion of the throttle valve 5. In addition, orifices 45, 46 are provided in the vacuum supply passage 17 on both sides of the solenoid valve 18, and an orifice 47 is provided in the vacuum supply passage 17 between the surge tank 20 and the vacuum chamber 16a. An orifice 48 is provided in the atmospheric pressure supply passage 19.

The vacuum supply passage 17 communicates, between the vacuum chamber 16a and the orifice 47, to the atmosphere through an atmospheric pressure supply passage 49. A solenoid valve 50 is provided in the atmospheric pressure supply passage 49 and makes the communication therethrough when a solenoid 50a disposed in it is energized.

The solenoids 15a, 18a, 50a of the solenoid valves are electrically connected to a control circuit 57. The control circuit 57 is supplied with an output signal of an oxygen sensor 59 which is disposed in the exhaust manifold 58 to produce an output voltage $V_{O_2}$ whose level is responsive to the oxygen concentration in the exhaust gas. The output voltage $V_{O_2}$ of the oxygen sensor 59 increases as the oxygen concentration becomes high. In addition to the above elements, a Pc vacuum switch 60, a rotational speed switch 61, an intake air temperature switch 62, a cooling water temperature switch 63, a vehicle speed switch 64, and a no-load switch 65 are connected to the control circuit 57.

The Pc vacuum switch 60 is provided to detect the magnitude of the vacuum Pc which is present in the vacuum detection hole 8. The Pc vacuum switch 60 is supplied with a high level voltage $V_H$ and turns on when the magnitude of the vacuum Pc is equal to or lower than a predetermined first pressure $P_1$ (30 mm Hg for example). The rotational speed switch 61 turns on when the engine rotational speed is equal to or higher than a predetermined rotational speed $N_1$ (900 r.p.m. for example). The intake air temperature switch 62 turns on when the temperature of the intake air $T_A$ is equal to or higher than a predetermined temperature $T_1$ (18° C. for example) and the cooling water temperature switch 63 turns on when the cooling water temperature $T_W$ of the engine is equal to or higer than a second predetermined temperature $T_2$ (70° C. for example). On the other hand, the vehicle speed switch turns on when the vehicle speed Vh is equal to or higher than a predetermined speed $V_1$ (15 Mile/h for example). Further, the no-load switch 65 is, for example, a clutch switch which turns on when a clutch pedal of the vehicle is depressed. These switches 60 through 65 respectively produce a high level output signal of the level $V_H$ when turned on, and the high level output signal is supplied to the control circuit 57.

Figure 2:
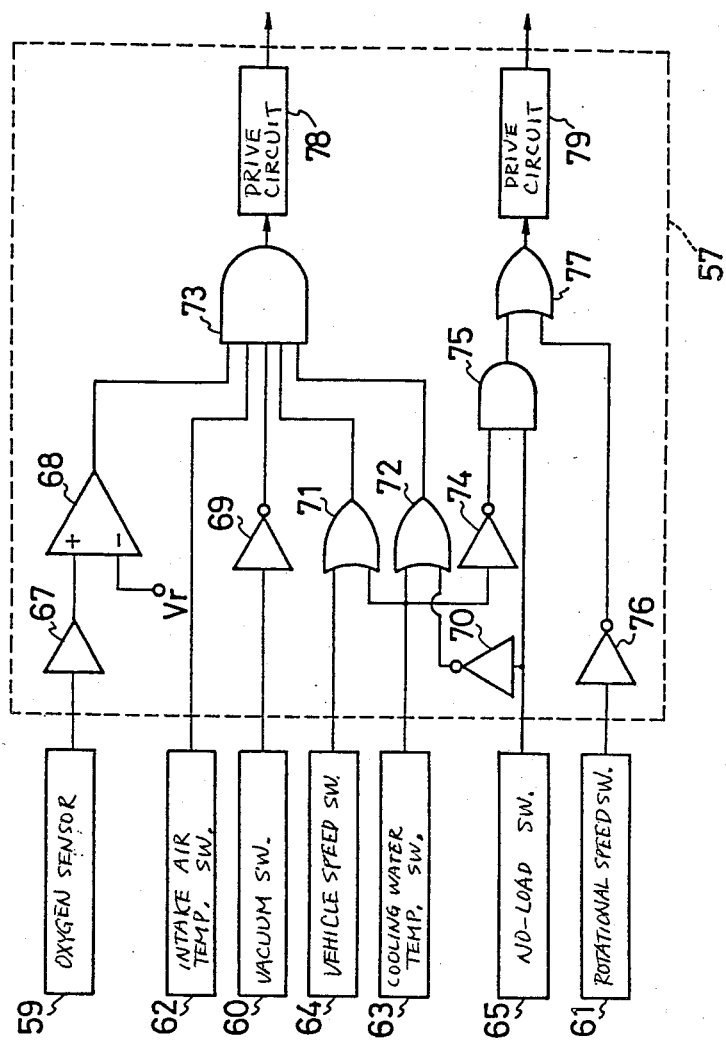
FIG. 2 is a block diagram showing the construction of the control circuit of the system of FIG. 1.

As shown in FIG. 2, the control circuit 57 includes a comparator 68 which compares the output voltage $V_{O_2}$ of the oxygen sensor 59 supplied through a buffer amplifier 67 with a predetermined reference level Vr corresponding to the stoichiometric air/fuel ratio. In the control circuit 57, an invertor 69 receives the output signal of the Pc vacuum switch 60 and an invertor 70 receives the output signal of the no-load switch 65. An OR gate 71 receives the output signals of the cooling water temperature switch 63 and the vehicle speed switch 64, and provide an output signal when at least one of the above output signals is supplied. Similarly, an OR gate 72 is provided to receive the output signals of the cooling water temperature switch 63 and the invertor 70, to provide an output signal when at least one of the above output signals is supplied. Further, an AND circuit 73 is provided to give a logical product among output signals of the intake air temperature switch 62, the comparator 68, the invertor 69, and the OR gates 71 and 72. The control circuit 57 further includes an invertor 74 connected to the output of the cooling water temperature switch 63, an AND gate 75 which gives a logical product between output signals of the no-load switch 65 and the invertor 74, an invertor 76 connected to the output of the rotational switch 61, and an OR gate 77 for receiving output signals of the AND gate 75 and the invertor 76. A drive circuit 78 for driving the solenoid valves 15 and 18 is connected to an output terminal of the AND gate 73. Similarly, a drive circuit 79 for driving the solenoid valve 50 is connected to an output terminal of the OR gate 77.

In the exhaust manifold 58, at a location downstream of the oxygen sensor, there is provided a three-way catalytic converter 80.

The operation of the thus constructed air intake side secondary air supply system according to the present invention will be described hereinafter.

Among the operations of various parts of the system, the operation of the vacuum control part 31 is explained first.

When the Pc vacuum from the vacuum detection hole 8 is applied to the vacuum chamber 33a via the vacuum passage 36 with the operation of the engine 4, the valve element 33e is moved in a direction to open the air valve 33 if the vacuum pressure Pc is greater than the resilient force of the valve spring 33d. When the air valve 33 opens, outside air from the atmospheric air inlet port 34 is introduced to the intake manifold 10 downstream of the throttle valve 5, via the control air passage 35. Levels of a vacuum Pa in the vacuum chamber 32a through which the outside air passes and a vacuum Pb in the valve chamber 33b, are determined in accordance with the aperture ratios of the orifices 39 and 40 respectively.

On the other hand, if the differential pressure between a vacuum Pv from the vacuum detection hole 9 operating in the valve chamber 32b and the vacuum Pa is greater than the resilient force of the valve spring 32d, the valve element 32e is moved in a direction to open the valve 32. When the regulation valve 32 opens, a part of the vacuum Pv is directed to dilute the vacuum Pc past the orifice 41, to produce a vacuum Pe.

Subsequently, due to a reduction of the vacuum Pc consequent on a reduction of the vacuum Pe, the opening degree of the air valve 33 is decreased to reduce the amount of the air flowing through the control air passage 35. By this reduction in the air flow amount, the vacuum Pa in the vacuum chamber 32a is reduced to close the regulation valve 32. As a result, the level of vacuum Pe is raised again and these sequential operations are repeated. It is to be noted that the ratio between the vacuum Pv and the vacuum Pe becomes equal to the ratio between the vacuum Pa and the vacuum Pb, because these operations are repeated very fast.

When the amount of a main intake air of the engine 4 is relatively small, the vacuum Pa is greater than the vacuum Pv. Therefore, the opening degree of the reagulation valve 32 becomes large and the vacuum Pe becomes low as a result. As an increase of the main intake air, the vacuum Pv becomes large. Under such a condition, the opening degree of the regulation valve 32 becomes small and the vacuum Pe in turn becomes high. The vacuum Pe is applied to the vacuum chamber 33a and the vacuum chamber 12a of the first air control valve 12, to open the air control valve 33 and the first air control valve 12. Therefore, the amount of the air flowing through the control air passage 35 becomes proportional to the amount of the secondary air flowing through the air control passage 11a when the solenoid valve 15 is open. Since the amount of the air flowing through the air control passage 35 is proportional to the main intake air of the engine 4, the amount of the above described secondary air becomes proportional to the amount of the main intake air. Therefore, the level of the vacuum Pe becomes proportional to the amount of the main intake air.

In the control circuit 57, if the voltage level $VO_2$ of the oxygen sensor 59 is greater than the predetermined voltage level Vr ($VO_2 \geq Vr$), it means that the air/fuel ratio is rich. In this condition, the output signal level of the comparator 68 is high. If the voltage level $VO_2$ is lower than the predetermined level Vr ($VO_2 < Vr$), it means that the air/fuel ratio is lean, and the output signal level of the comparator 68 becomes low.

Assuming that the engine is warmed up, the intake air temperature $T_A$ is higher than the predetermined temperature $T_1$. In this state, the intake air temparature switch 62 is turned on, to provide the high level signal to the AND gate 73. Also, the cooling water temperature switch 63 is turned on to provide the high level output signal to the AND gate through the OR gates 71 and 72 because the cooling water temperature $T_W$ is higher than the second predetermined temperature $T_2$ in this state. Therefore, the variation of the output signal level of the AND gate 73 becomes identical with the variation of the level of the output signal of the comparator 68. When the air/fuel ratio is detected to be rich from the output signal level of the oxygen sensor 59, the output signal level of the AND gate 73 becomes high, and the output signal of the AND gate 73 is in turn supplied to the drive circuit 78 as a "rich signal". Conversely, when the air/fuel ratio is detected to be lean from the output signal level of the oxygen sensor 59, the output signal level of the AND gate 73 becomes low, and the output signal of the AND gate 73 is supplied to the drive circuit 78 as a "lean signal".

In response to the rich signal, the drive circuit 78 energizes the solenoids 15a and 18a, and the solenoid valves 15 and 18 are made operated. On the other hand, solenoids 15a and 18a are deenergized by the drive circuit 78 in response to the rich singal, and the solenoid valves 15 and 18 are made unoperated.

When the cooling water temperature $T_W$ is equal to or higher than the second predetermined temperature $T_2$, the cooling water temperature switch 63 is turned on to provide the high level output signal. This high level signal is transformed to a low level signal by means of the invertor 74 and in turn supplied to the AND gate 75. Also, when the clutch of the engine is engaged to enable the transmission of the engine power, the no-load switch 65 is turned off so that a low level signal is supplied from the no-load switch to the AND gate 75. When either one of input lines of the AND gate receives the low level signal, the output signal level of the AND gate turns low. In this state, if the engine rotational speed $N_e$ is higher than the predetermined speed $N_1$, the rotational speed switch 61 is turned on to provide the high level signal. This high level signal is converted to a low level signal by the invertor 76. With the low level output signals of the AND gate 75 and the invertor 76, the OR gate 77 provides a low level output signal. Therefore, the drive circuit 79 does not drive the solenoid valve 50 to open. Thus, the atmospheric pressure supply passage 49 is closed by the closure of the solenoid valve 50 in this state.

When the solenoid valves 15 and 18 are made operated during the closure of the solenoid valve 50, the solenoid valve 15 is immediately opened and the secondary air of an amount corresponding to the opening degree of the first air control valve 12, that is, an amount proportional to the main intake air amount, flows through the air control passage 11a. At the same time, communication through the vacuum supply passage 17 is made by the solenoid valve 18, and the passage to the atmospheric pressure supply passage 19 is closed. Therefore, the vacuum chamber 16a of the second air control valve 16 is supplied with the vacuum Pr. Therefore, the vacuum level in the vacuum chamber 16a gradually approaches to the vacuum Pr by a remaining pressure in the surge tank 20 and the operation of the orifices 45 through 47. As a result, the second air control valve 16 is opened and the secondary air starts to flow through the air control passage 11b. As the vacuum level in the vacuum chamber 16a approaches to the vacuum Pr, the opening degree of the air control valve 16, that is, the sectional area of the air control passage 11b gradually increases so that the amount of the secondary air increases. Therefore, the secondary air respectively flowing through the air control passages 11a and 11b are added together and supplied to the engine 4 via the air intake side secondary air supply passage 11. In this way, the air/fuel ratio of the mixture supplied to the engine is controlled to the lean side and the amount of the secondary air supplied to the engine gradually increases with time.

When, subsequently, the solenoid valves 15 and 18 are made unoperated while the solenoid valve 50 is closed, the air control passage 11a is immediately closed by the closure of the solenoid valve 15. At the same time, the vacuum supply passage 17 is closed by the solenoid valve 18 in same manner as above, and the communication between a part of the vacuum supply passage 17 on the side of the vacuum chamber 16a and the atmospheric pressure passage 19 is made. Therefore, the the pressure in the vacuum chamber 16a gradually approaches to the atmospheric pressure by means of the residual pressure in the surge tank 20 and the operation of the orifices 48, 45 and 47. As a result, the sectional area of the air control passage 11b is gradually decreased, and the amount of the secondary air is also gradually decreased with time. Thus, the air/fuel ratio of the mixture is controlled towards the rich side.

In the feedback control operation of the air/fuel ratio to the stoichiometric value, the secondary air flows through the air control passage 11a intermittently because the rich signal and the lean signal are generated alternately and continuously. Thus, the amount of the secondary air is controlled by the so called proportional (P) control operation. On the other hand, through the air control passage 11b, the secondary air flows in such a manner that its amount increases upon presence of the rich signal and decreases upon presence of the lean signal. Thus, the so called integration (I) control is performed. Therefore, the total amount of the secondary air flowing through the intake side secondary air passage 11 becomes equal to a summation of the amount of proportional control and the amount of the integral control.

Now, the operation of the system during a warm-up period of the engine after a cold start will be explained. If the intake air temperature TA is below the predetermined temperature $T_1$, the intake air temperature switch 62 is turned off to provide a low level signal to the AND gate 73. In this state, the AND gate 73 provides a low level output signal to the drive circuit 78 irrespectively of the output signal level of the comparator 68, i.e. the output signal level of the oxygen sensor 59. By the application of the low level signal, the drive circuit 78 stops the operation of the solenoid valves 15 and 18 as in the case in which the lean signal is applied. Therefore, the solenoid valve 18 is deenergized so that the vacuum chamber 16a of the air control valve 16 (the second air control valve) is supplied with the atmospheric pressure through the the solenoid valve 18, the orifices 45 and 47, and the surge tank 20. Thus, the air control valve 16 is also made closed. In this way, the air control passages 11a and 11b, i.e. the air intake side secondary air supply passage 11 is closed to stop the feedback control of the air/fuel ratio. As a result, the air/fuel ratio is enriched in this state.

Under the condition where the intake air temperature $T_A$ is equal to or higher than the predetermined temperature $T_1$, the cooling water temperature switch 63 and the vehicle speed switch 64 are turned off if the cooling water temperature $T_W$ is lower than the second predetermined temperature $T_2$ and at the same time the vehicle speed V is lower than the predetermined speed $V_1$. In this state, both of two input terminals of the OR gate 71 receive a low level signal and a low level signal is supplied from the OR gate 71 to the AND gate 73. Therefore, the AND gate 73 produces a low level output signal so that the air intake side secondary air supply passage 11 is closed in the same manner as the case where the intake air temperature $T_A$ is lower than the predetermined temperature $T_1$. Thus, the feedback control of the air/fuel ratio is stopped to enrich the air/fuel ratio.

During a cold operation of the engine where the cooling water temperature $T_W$ is lower than the second predetermined temperature $T_2$, the no-load switch 65 is turned on if the clutch pedal is depressed to disengage the clutch and the transmission of the engine power is cut off. In this state, the high level signal is supplied from the no-load switch 65 to the invertor 70 which in turn supplies a low level signal to the OR gate 72. Since the OR gate 72 also receives a low level signal from the cooling water temperature switch 63, the OR gate 72 supplies a low level signal to the AND gate 73. In this way, the output signal leve of the AND gate 73 is turned to the low level and the system operates in the same manner as in the case where the intake air temperature $T_A$ is lower than the predetermined level $T_1$.

When the cooling water temperature $T_W$ is lower than the predetermined level $T_2$, the invertor 74 produces a high level output signal. If the no-load switch is turned on by the disengagement of the clutch under this state, the high level signal is supplied to the AND gate 75 which in turn supplies a high level signal to the drive circuit 79 through the OR gate 77.

By the high level output signal of the OR gate 77, the drive circuit 79 actuates the solenoid valve 50 to make a communication through the atmospheric pressure supply passage 49. As a result, the atmospheric pressure is supplied through the solenoid valve 50 disposed in the atmospheric pressure supply passage 49 to the vacuum supply passage 17 between the orifice 47 and the vacuum chamber 16a of the air control valve 16. Thus, the pressure within the vacuum chamber 16a rapidly becomes equal to the atmospheric pressure. In this way, the air control valve 16 is rapidly closed to shut the air control passage 11b after the opening of the solenoid valve 50.

In summary, the feedback control of the air/fuel ratio is executed when the cooling water temperature $T_W$ is lower than the second predetermined temperature $T_2$ and at the same time the vehicle speed V is equal to or higher than the predetermined speed $V_1$. However, if the clutch is disengaged under this condition, the air control passages 11a and 11b are closed immediately so that the air/fuel ratio is enriched by stopping the feedback control of the air/fuel ratio.

Further, in a low speed range of the engine operation in which the rotational speed of the engine Ne is lower than the predetermined rotational speed $N_1$, the rotational speed switch 61 is turned off and the high level output signal is produced by the invertor 76. This high level output signal of the invertor 76 is supplied to the driver 79 through the OR gate 77. Thus, the solenoid valve 50 is opened to close the air control passage 11b when the rotational speed of the engine is lower than the predeterined rotational speed $N_1$. Therefore, if the feedback control of the air/fuel ratio is executed under this condition, the supply of the air intake side secondary air is performed intermittently, only through the air control passage 11a, by the opening and closing of the solenoid valve 15. Thus, only the proportional control is performed under this condition.

Under a low load operating condition of the engine in which the opening angle of the throttle valve 5 is lower than the predetermined small opening angle $\theta_1$, the magnitude of the vacuum Pc in the vaccum detection hole 8 becomes equal to or lower than the predetermined pressure $P_1$. Therefore, the Pc vacuum switch 60 turns on to provide the high level signal to the invertor 69 which in turn supplies a low level signal to the AND gate 73. Thus, the AND gate 73 supplies the low level signal to the drive circuit 78 without regard to the output signal level of the comparator 68. Accordingly, the feedback control of the air/fuel ratio is stopped to enrich the air/fuel ratio of the mixture to be supplied to the engine.

It is to be noted that the detection of the no-load state of the engine is not limited to the method used in the above embodiment in which the operating condition of the clutch is utilized to detect the no-load state. As an example if the vehicle is provided with a manual transmission system (MT), the no-load state can be detected as a state where the transmission gear is shifted at a neutral (N) position. Further, in the case of a vehicle having an automatic transmission system (AT), the no-load state of the engine can be detected as a state where the transmission shift position is in a parking range (P) or a neutral range (N).

It will be appreciated from the foregoing, according to the present invention, the second one of the air intake side secondary air supply passages is closed by the rapid closure of the air control valve which is caused by the rapid application of the the pressure such as the atmospheric pressure into the pressure chamber of the air control valve when it is detected that the engine is operating with the low temperature and at the same time no load is applied to the engine. In orther words, under such a condition, the system stops the integral control of the air/fuel ratio in which the amount of the air intake side secondary air is gradually increased or decreased by the operation of the air control valve, i.e. the second air control valve 16, in response to a result of the detection of the air/fuel ratio. Moreover, in addition to the closure of the second secondary air supply passage, the first air intake side secondary air supply passage is immediately closed by the open/close valve, i.e. the solenoid valve 15, so that the feedback control of the air/fuel ratio is stopped when the engine operation is under the above mentioned condition of the low temperature and no-load. In this way, the supply of the over-lean mixture at the time of gear shift operation or the deceleration when the temperature of the engine is low, is avoided. Thus, the hunting of the rotation of the engine is prevented so that the driveability of the engine is greatly improved.

What is claimed is:

1. An air intake side secondary air supply system for an internal combustion engine having an intake air passage with a carburettor and a throttle valve, comprising:
    a first secondary air supply passage leading to the intake air passage downstream of the throttle valve;
    a second secondary air supply passage leading to the intake air passage downstream of the throttle valve;
    air/fuel ratio detection means for detecting an air/fuel ratio of a mixture supplied to the engine from a composition of an exhaust gas of the engine;
    an open/close valve disposed in said first secondary air supply passage which is operated to open only when said detection means detect a rich air/fuel ratio;
    an air control valve having a pressure chamber and disposed in said second secondary air supply passage, for varying a sectional area of a flow through said second secondary air supply passage in response to a magnitude of a pressure applied in said pressure chamber;
    a first control pressure source for generating a first control pressure for opening said air control valve;
    a second control pressure source for generating a second control pressure for closing said air control valve;
    engine operation detection means for detecting a state of engine operation in which an engine temperature, is lower than a predetermined temperature and no load is applied to the engine, and for generating an engine operation detection signal upon detection of said state of engine operation; and
    pressure control means for gradually supplying said first control pressure to said pressure chamber so as to gradually increase said sectional area when said air/fuel ratio detection means detect the rich air/fuel ratio, and supplying gradually said second control pressure to said pressure chamber so as to gradually decrease said sectional area when said air/fuel ratio detection means detect a lean air/fuel ratio and said engine operation detection signal is not produced, and rapidly supplying said second control pressure to said pressure chamber so as to rapidly close said air control valve when said engine operation detection signal is produced by said engine operation detection means.

2. A system as set forth in claim 1, wherein a power transmission system having a clutch is connected to the engine and wherein said engine operation detection means detect that no load is applied to the engine when the clutch of the power transmission system of the engine is disengaged.

3. A system as set forth in claim 1, wherein an automatic transmission system is connected to the engine and wherein said engine operation detection means detect that no load is applied to the engine when a shift position of the automatic transmission system is in one of a parking range or a neutral range.

4. A system as set forth in claim 1, wherein said pressure control means have a further operation to close said open/close valve when said engine operation detection signal is produced.

5. A system as set forth in claim 1, wherein said pressure control means comprises a three way solenoid valve connected to said pressure chamber via pressure supply passage and said first and second control pressure sources, an orifice provided in said pressure supply passage for regulating transmissions of said first and second control pressures, and a solenoid valve connected to said second control pressure source and to said pressure supply passage between said air control valve and said orifice, operated in response to said engine operation detection signal to supply said second control pressure rapidly when said engine operation detection signal is produced.

* * * * *